United States Patent
Linnermark

(10) Patent No.: US 6,363,472 B1
(45) Date of Patent: Mar. 26, 2002

(54) METHOD AND SYSTEM FOR MINIMIZING EFFECT OF REPLACING PROGRAMMING LANGUAGES IN TELEPHONY SYSTEMS

(75) Inventor: Nils Ola Axel Linnermark, Haninge (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/146,135

(22) Filed: Sep. 3, 1998

(51) Int. Cl.[7] .............................................. G06F 15/00
(52) U.S. Cl. ........................................................ 712/36
(58) Field of Search ............................ 712/1, 3, 23, 31, 712/32, 34, 35, 36

(56) References Cited

U.S. PATENT DOCUMENTS

| | | | | |
|---|---|---|---|---|
| 4,516,199 A | * | 5/1985 | Frieder et al. .................. 4/228 |
| 4,893,234 A | * | 1/1990 | Davidson et al. .............. 712/27 |
| 5,325,526 A | * | 6/1994 | Cameron et al. ........... 709/102 |
| 5,349,656 A | * | 9/1994 | Kaneko et al. .............. 709/102 |
| 5,355,485 A | * | 10/1994 | Denio et al. ................. 709/213 |
| 5,452,461 A | * | 9/1995 | Umekita et al. ............. 395/706 |
| 5,822,422 A | | 10/1998 | Daase et al. ................. 379/269 |
| 5,911,065 A | * | 6/1999 | Williams et al. ............. 709/107 |
| 5,923,892 A | * | 7/1999 | Levy ............................. 712/31 |
| 6,029,000 A | * | 2/2000 | Woolsey et al. ............. 395/705 |
| 6,069,705 A | * | 5/2000 | Suvarna ...................... 358/1.13 |

FOREIGN PATENT DOCUMENTS

| | | |
|---|---|---|
| EP | 0 228 048 A2 | 7/1987 |
| EP | 0 544 637 A2 | 6/1993 |
| EP | 0 766 487 A2 | 4/1997 |

* cited by examiner

Primary Examiner—John A. Follansbee
(74) Attorney, Agent, or Firm—Jenkens & Gilchrist, P.C.

(57) ABSTRACT

A separate executing processor is provided for a different programming language in each CP in a multi-CP digital switching system. As such, each CP in the multi-CP system can utilize a common program and data store and scheduling unit, which support two or more executing processors. Each executing processor can execute a different application using a different programming language. Consequently, the CPs can execute applications using older programming languages, in addition to executing the same or different applications with new programming languages. This approach minimizes the impact of replacing the older programming languages with the newer languages.

13 Claims, 4 Drawing Sheets

METHOD AND SYSTEM FOR MINIMIZING EFFECT OF REPLACING PROGRAMMING LANGUAGES IN TELEPHONY SYSTEMS

BACKGROUND OF THE INVENTION

1. Technical Field of the Invention

The present invention relates in general to the telephony field and, in particular, to a method and system for minimizing the effect of replacing central processor programming languages in telephony systems.

2. Description of Related Art

There are numerous new design requirements being imposed on manufacturers of digital switching systems. For example, there are many new programming languages being required for use in digital switching system central processor software applications, in addition to very high capacity switch requirements. These new programming language requirements are being imposed on the manufacturers by both the telecommunication system operators that purchase the switching systems and the manufacturers themselves. As such, there are numerous and different new programming language requirements being imposed on digital switching system designs for different software applications, different customers, and also different business entities within the manufacturers' own organizations.

The primary reasons for these new programming language design requirements are the stringent time-to-market development and manufacturing constraints being imposed, the ability to purchase source code for certain software applications, and the fact that the existing switching system central processor programming languages are simply out-of-date. For example, the well-known PLEX programming language has long been in use for central processor software applications in the present generation of digital switching systems, such as in the AXE Digital Switching Systems manufactured by Ericsson Telecom AB.

Generally, in most software applications, the use of more modern programming languages can reduce the number of source code statements required per task, which in turn can reduce software development time, support costs, and costs for error corrections and other changes. However, as mentioned earlier, a significant amount of existing digital switching system software has been written in the "older" (e.g., PLEX) programming languages, and many of these programs have been in development over very long periods of time. As such, there can be an enormous amount of staff-hours and related costs already invested in the development of these programs. Consequently, it would be highly impractical for many reasons (e.g., cost, reliability, delays, etc.) to replace the existing programs with programs re-written in one or more new programming languages. Therefore, a scheme is needed to replace current application software (e.g., programs written in PLEX) on a per program unit basis, while retaining the basic mechanisms needed for interoperability between the hardware units and software modules.

Preferably, any scheme used for replacing the existing software should form part of an organization's normal support process flow for creating new software and/or updating existing software. Furthermore, such a software replacement scheme should consider the fact that future telecommunications systems will be required to be more heterogeneous with respect to the programming languages being used. In other words, the days of meeting customer requirements for single programming languages used in all applications and all processor environments are gone.

The Capacity Modular Control (CMC) System is the newly developed version of the multi-central processor (multi-CP) AXE 10 Digital Switching System manufactured by Ericsson Telecom AB. The main purpose of the CMC System is to interconnect several CPs, which enables them to share the processing load and thereby increase the overall system capacity. A simplified block diagram of an exemplary CMC System (10) is shown in FIG. 1A. As shown, the individual CPs 12, 14, 16 are coupled together via an Inter-Processor Network (IPN) 18. The IPN also couples other types of processors together, such as the pair of Adjunct Processors (APs) 20, 22 shown.

Typically, a telephony system CP has three main components: (1) an executing processor; (2) a program and data store; and (3) a scheduling unit. For example, referring to FIG. 1B, each CP 12 (14, 16) in a CMC System includes an executing processor 24, which executes instructions for both the application programs and operating system. Each CP also includes a program and data store 26 that is subdivided into different parts, each of which supports a known hardware entity or software function, such as job-handling, variable-handling, memory caches, etc. A scheduling unit 28 is also included in each CP, which schedules jobs in the correct order for the executing processor 24, and also communicates with other processors that support communications with peripherals and other processors in the system, such as, for example, with Input/Output Group (IOG) 30 or Regional Processor (RP) 32 via an RP Bus (RPB) 34.

A problem with conventional and more recently developed central processor schemes (e.g., CMC) is that an executing processor in each CP (e.g., 12, 14, 16) executes applications in only one programming language. Also, as illustrated by the CMC scheme, each executing processor is associated with only one program and data store and scheduling unit. Consequently, in order to update or replace an existing programming language, the application software has to be rewritten for the same executing processor, or the application has to executed by a different executing processor in a different CP. Therefore, when combining different types of executing processors, some of them are likely to be only partly utilized. Furthermore, when a multi-CP system (e.g., CMC) is utilized for increased capacity, an operator has to allocate software to the different CPs in order to maximize the system's capacity. However, in this case, the communication path between CPs acts as a bottleneck.

U.S. Pat. No. 5,452,456 to Mourey et al. describes an approach that uses different instruction sets for different parts of a program. As such, the main purpose of the approach described in the Mourey patent is to utilize a new processor architecture without having to recompile all of the software. However, the Mourey approach of using different languages in one program is not as efficient as an approach that would use one compiler and software architecture for the same programming language and source code. As described in detail below, the present invention takes such an approach and also successfully resolves the above-described problems.

SUMMARY OF THE INVENTION

The preferred embodiment of the present invention provides a separate executing processor for each programming language in each CP. As such, each CP in a multi-CP system utilizes a common program and data store and scheduling unit, which support two or more executing processors. Each executing processor can execute a different application using a different programming language. Consequently, applications using older programming languages can be executed by the CPs, in addition to the same or different applications being executed with new programming languages.

An important technical advantage of the present invention is that each executing processor can be more efficiently if not completely utilized.

Another important technical advantage of the present invention is that maximum capacity can be obtained from a single program and/or data store.

Yet another important technical advantage of the present invention is that the executing processors are more language-specific than the scheduling units and program and data stores, which allows the use of specialized hardware support and places special demands on the executing processors to operate more efficiently. The hardware support can be for sub-variable accessing, functional changes, file size alterations (e.g., for PLEX), fast context switching, function calls and efficient access to function-local data (e.g., for Erlang), inheritance support, pointer manipulation and garbage collection (e.g., for Java), etc.

Still another important technical advantage of the present invention is that for each high level language being executed, an appropriate assembly language can be used to reduce the source code volume, which reduces the bandwidth demand for program store reads, the demands on the cache volume, and the overall cost of the program.

Still another important technical advantage of the present invention is that an executing processor used can be either off-the-shelf (out-sourced) or custom designed. For a common sourced processor, it is possible to purchase higher quality compilers, debuggers, etc.

Yet another technical advantage of the present invention is that it is possible to combine program language flexibility (relatively easy to change from one programming language to another) with higher system capacity and overall cost-effectiveness.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1A:
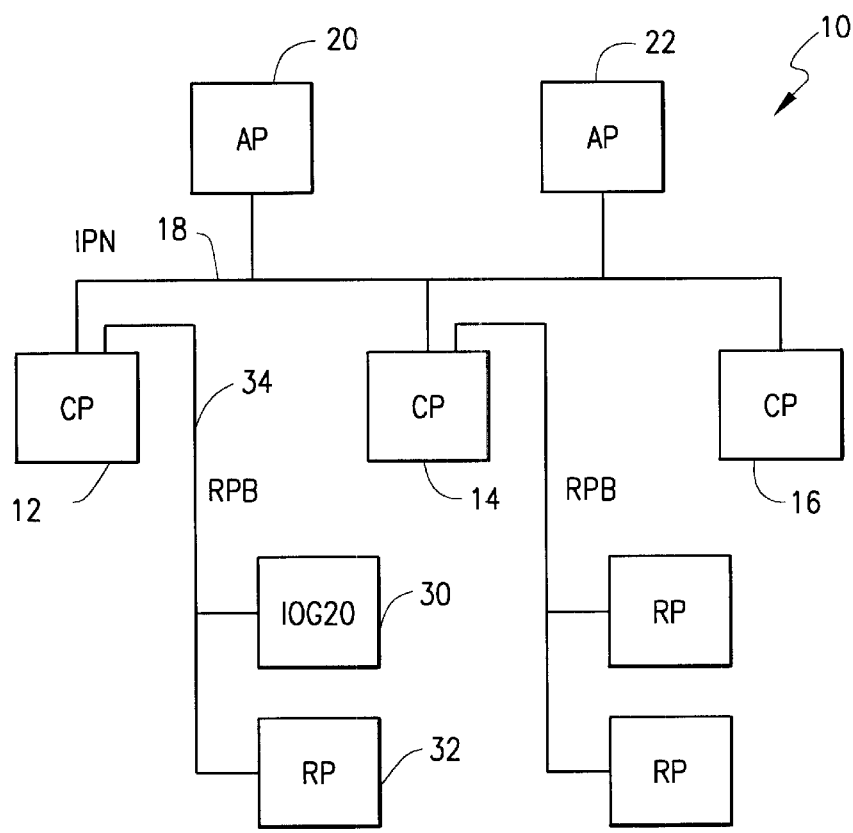
FIG. 1A is a simplified block diagram of an existing modular central processing system for a digital communications switching system.
Figure 1B:
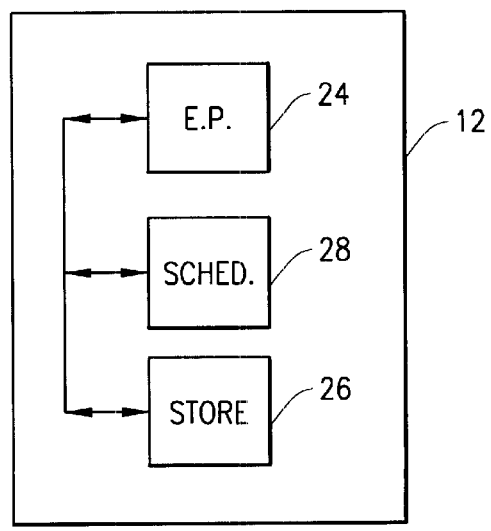
FIG. 1B is a simplified block diagram of a central processor in the modular central processing system shown in FIG. 1A.
Figure 2A:
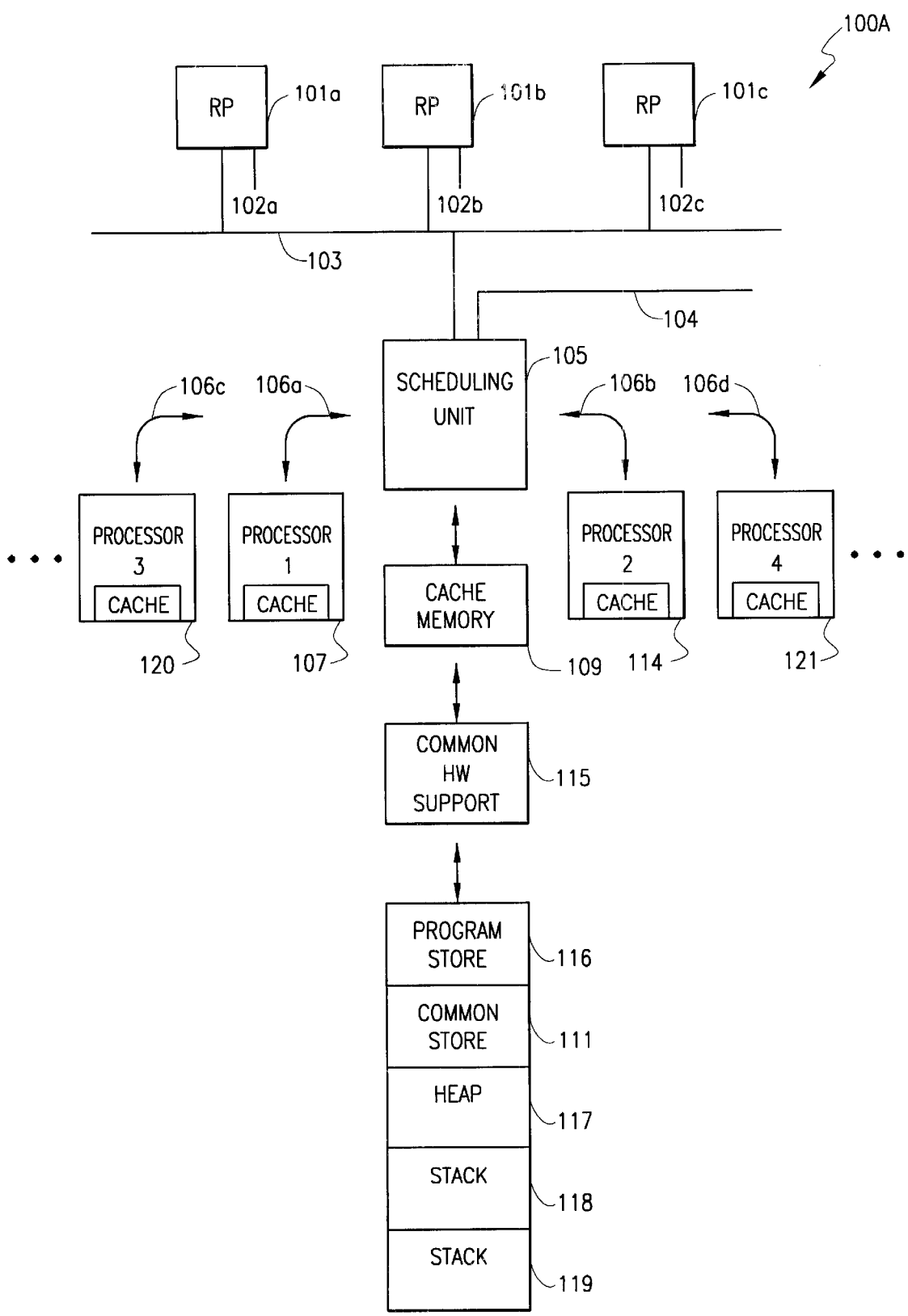
FIG. 2A is a simplified block diagram of a central processor, which can be used to implement a preferred embodiment of the present invention.
Figure 2B:
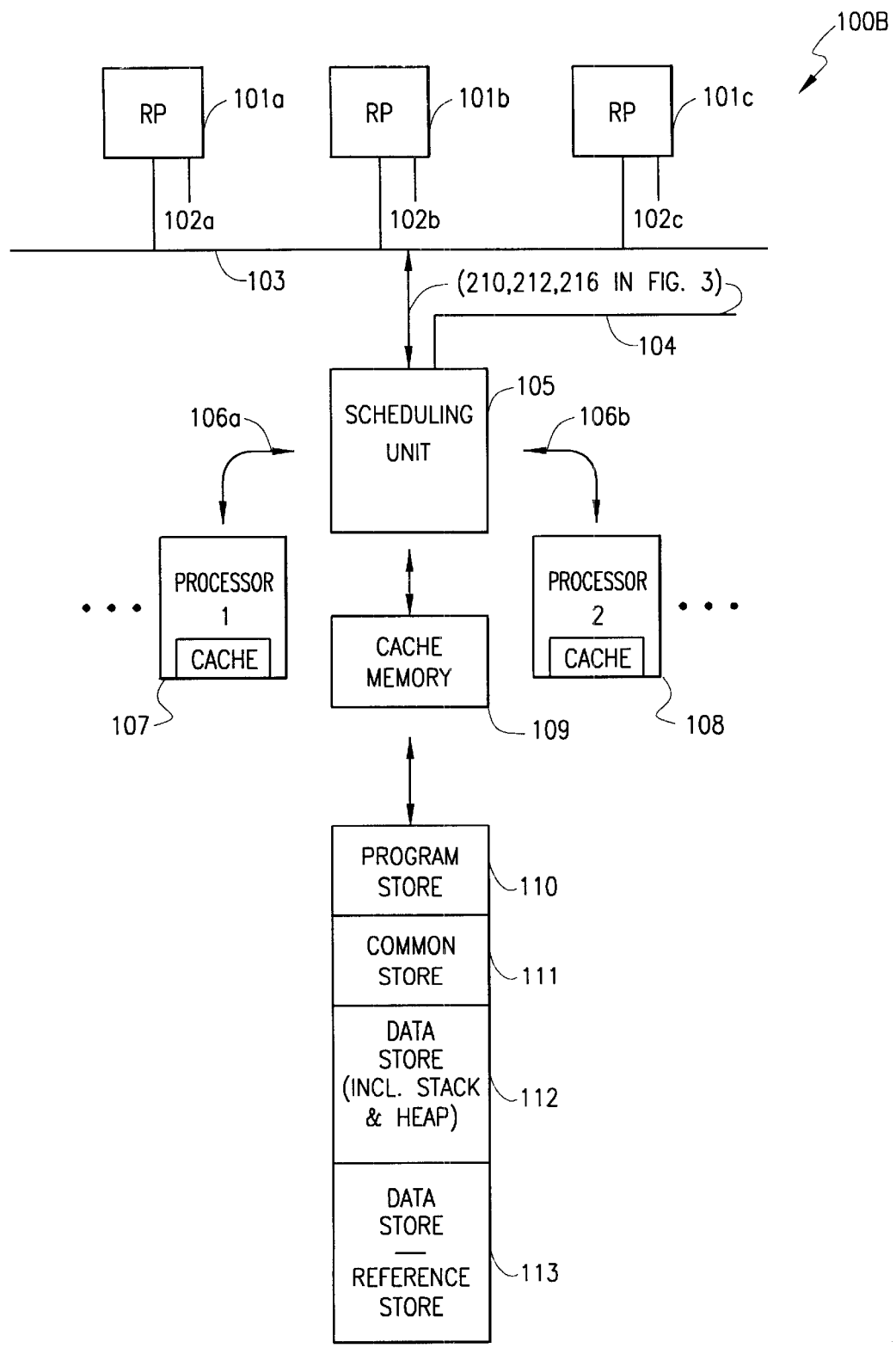
FIG. 2B is a simplified block diagram of a second central processor, which can be used to implement a second embodiment of the present invention.
Figure 3:
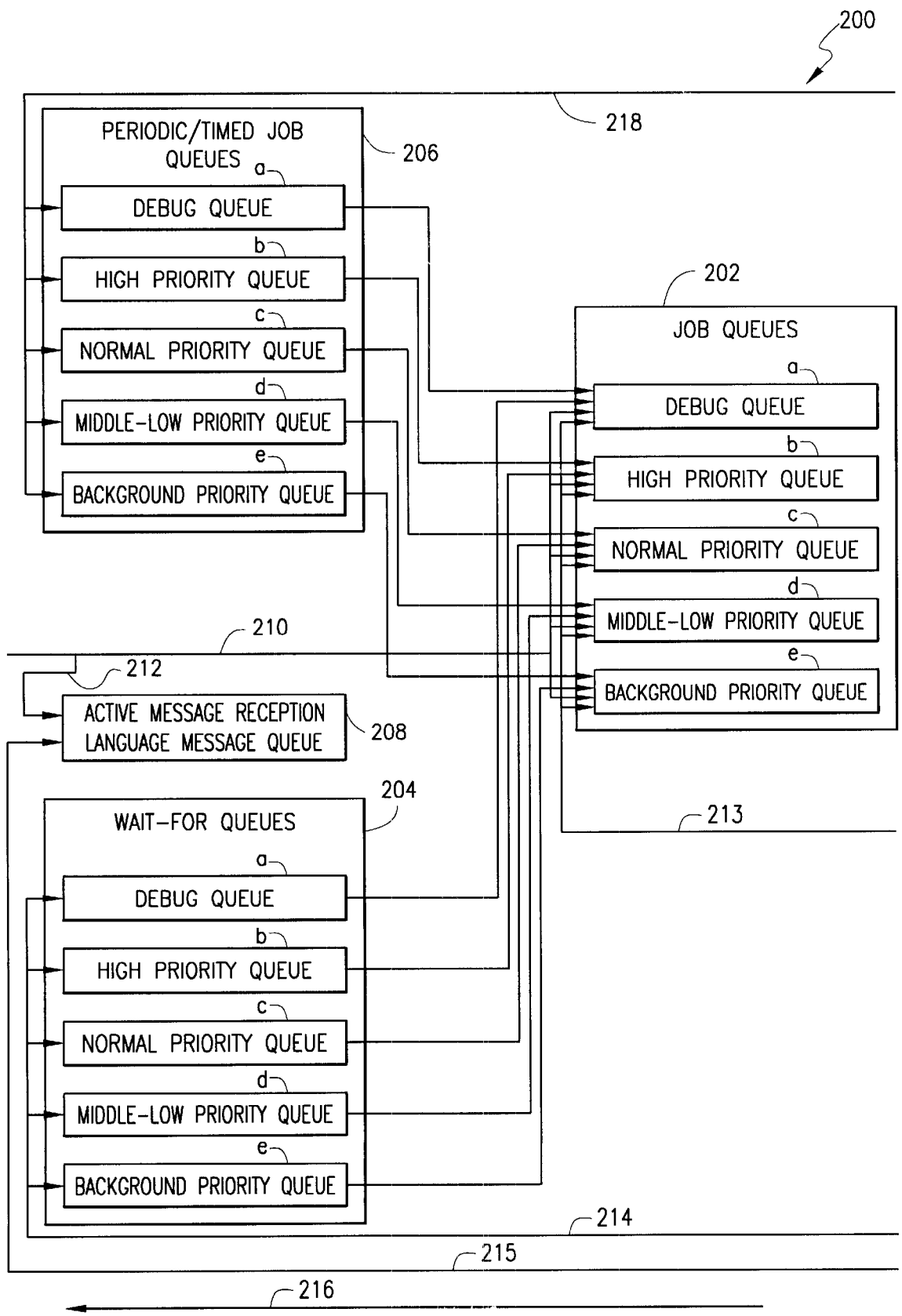
FIG. 3 is a block diagram of a scheduling unit that can be used in the exemplary central processors shown in FIGS. 2A and 2B to implement the present invention.

The preferred embodiment of the present invention and its advantages are best understood by referring to FIGS. 1–3 of the drawings, like numerals being used for like and corresponding parts of the various drawings. Essentially, in accordance with a preferred embodiment of the present invention, a separate executing processor is provided for each programming language in each CP. As such, each CP in a multi-CP system utilizes a common program and data store and scheduling unit, which support two or more executing processors. Each executing processor can execute a different application using a different programming language. Consequently, applications using older programming languages can be executed by the CPs, in addition to the same or different applications being executed with new programming languages. Therefore, the older programming languages can be maintained along with the newer programming languages, or phased out slowly by the newer programming languages over a period of time.

Specifically, FIG. 2A is a simplified block diagram of a CP 100A, which can be used as one "side" of a CP in a multi-CP digital switching system, in accordance with a preferred embodiment of the present invention. FIG. 2B is a simplified block diagram of a second CP 100B, which can also be used as one "side" of such a CP, in accordance with a second embodiment of the present invention. However, although the exemplary embodiments shown in FIGS. 2A and 2B are described with respect to a multi-CP digital switching system, the invention is not intended to be so limited and can be implemented in any CP environment where programming language flexibility is desired.

In FIG. 2A, exemplary CP 100A includes a scheduling unit 105, which is coupled to a plurality of RPs 101a–c via an RPB 103, and also to an I/O Group and other communications devices (not shown) via an Ethernet interface 104. An example of a specific type of such a scheduling unit is a Signal Processor Unit (SPU) that has been utilized for PLEX applications in Ericsson AXE 10 Digital Switching Systems. Each RP 101a–c is coupled via a data connection 102a–c to a second RP. As such, for this embodiment, CP 100A (e.g., A-side CP) can be duplicated for redundancy in a second CP (B-side CP) operating in a parallel synchronous mode.

In accordance with the present invention, the scheduling unit 105 prepares the numerous jobs to be performed by each of the executing processors 107, 114, 120 and 121, which enables the executing processors to execute their respective programs continuously. For example, most telecommunication applications divide "work" into numerous small jobs, tasks, and/or processes. This approach is advantageous from a software-structuring point of view since each call being processed is in itself a small job compared to the total amount of "work" being done. Furthermore, in a telephony environment, each call can be sub-divided into a number of smaller jobs. Certain telecommunications programming environments, such as, for example, PLEX, Erlang and TelORB can support such applications that are sub-divided into a number of smaller jobs. However, the sub-division of "work" into a plurality of jobs can place special requirements on the scheduling mechanism used. The use of a specialized SPU for PLEX applications in the AXE Digital Switching Systems exemplifies such a requirement.

As opposed to software scheduling for device processors, the demands made on scheduling mechanisms for central processor software used in telecommunication applications can be characterized as "moderate real-time" (i.e., response time on the order of milliseconds). For this embodiment, there are two main channels for data and/or signal flow connected between each executing processor 107, 114, 120 and 121, and the scheduling unit 105. Each of these multi-channel connections is characterized by a respective double-arrowed line 106a–d. One such channel (in 106a, 106b, 106c or 106d) supports the flow of jobs to be executed (i.e., job starts) from the scheduling unit to the respective executing processor. The second such channel supports the flow of requests made from the respective executing processor to the scheduling unit. The multi-channel connections 106a–d can thus convey, for example, messages (signals), header parts, and data parts for RP messages and short messages.

For this exemplary embodiment, the requests made can be one of three types: (1) request for job, including message data (e.g., a PLEX buffered signal); (2) message sent; and (3) wait for message. The second and third request types can be used for programming languages that have active message reception capabilities. The scheduling unit 105 stores a "request for job" directly in a job queue (e.g., awaiting execution by an executing processor). For example, one job queue can be used for storing multiple job requests in the scheduling unit for multiple executing processors. As such, addressing information included in each such job request can be transformed (by the scheduling unit) into a specific code that selects an executing processor, or more precisely, an instruction set to be used for that job. Alternatively, a job queue located in the scheduling unit can be partitioned for separate executing processors, or a plurality of job queues can be used (e.g., one queue for each executing processor).

When a "message sent" or "wait for message" request is received in the scheduling unit (sent from one of the executing processors), the scheduling unit preferably attempts to combine that request with a "request for job". The scheduling unit then stores the resulting combined request in a job queue (with the appropriate priority level assigned). The function of combining a "message sent" or "wait for message" request with a "request for job" can be accomplished, for example, by conventional software or specialized hardware support (e.g., associative memories).

In scheduling a job request ("request for job"), the scheduling unit 105 can schedule an individual job request in the queue so that it can break into an ongoing job or wait for an ongoing job to be completed. The "break into" type of request can be used, for example, as an interrupt, timer or time-slicing function. In that case, a second job request associated with a "break into" request is inserted in the job queue for scheduling, which essentially functions as a "return to interrupted job".

The typical "older" programming languages (e.g., PLEX) do not support active message reception. As such, by sending a message to a higher priority level, execution of the message at the lower priority level is halted immediately and re-started at the higher priority level. This arrangement places certain requirements on the speed and design of the scheduling unit used.

On the other hand, many "newer" programming languages or telecommunication operating systems can readily implement more flexible scheduling principles than those implemented by the "older" programming languages. As such, the "newer" languages do not support scheduling for different priority levels in the sense that ongoing jobs must be halted immediately when a higher priority level job is presented from the queue. Conversely, in telecommunications applications, the "newer" programming languages are typically scheduled for execution in a time-slicing type of system, which ensures that no job is executed for more than a predetermined amount of time before another scheduled job event occurs. Consequently, as provided for by the present invention, scheduling of jobs for the newer programming languages preferably includes a mechanism for breaking into ongoing jobs, and then allows the interrupted jobs to continue at a later time.

Specifically, an important component in the exemplary system 100A and 100B which is used to implement the present invention, is the scheduling unit 105. As such, the scheduling unit 105 controls the flow of jobs being executed by the different executing processors 107, 114, 120, 121. In the preferred embodiment, one or more executing processors (e.g., 107, 120) can be running Erlang applications, and one or more other executing processors (e.g., 114, 121) can be running JAVA applications. In a different embodiment (e.g., as shown in FIG. 2B), one or more executing processors (e.g., 108) can be running PLEX applications in addition to those executing processors running Erlang applications (e.g., 107). Notably, the present invention is not limited to the specific number of executing processors shown or to the execution of Erlang, PLEX or JAVA applications. The scheduling unit 105 can control the scheduling of up to several executing processors at a time. As such, each of the executing processors can execute a different application with a specific programming language, such as, for example, PLEX, JAVA, Erlang, Pascal, Perl, TelORB, C, $C^+$, $C^{++}$, etc. Notably, for example, the C type processors can be the type of C processors that are currently commercially available in the microprocessor market.

FIG. 3 is a block diagram of a scheduling unit 200 that can be used as scheduling unit 105 in exemplary CP systems 100A and 100B (FIGS. 2A and 2B) to implement the present invention. The scheduling unit 200 stores a "request for job" directly in a job queue 202 (e.g., awaiting execution by an executing processor). One job queue can be used for storing multiple job requests in the scheduling unit for multiple executing processors. As such, addressing information included in an address field in each such job request is transformed by the operating system and the scheduling unit into a specific code that selects an executing processor (e.g., based on the programming language being executed by that processor), or more precisely, an instruction set to be used for that job. Alternatively, a job queue located in the scheduling unit can be partitioned for separate executing processors, or a plurality of job queues can be used (e.g., one queue for each executing processor).

The job queue 202 includes a plurality of prioritized queues, which determine the scheduling of the job requests stored in the job queue. For example, the highest priority jobs handled first by the scheduling unit are the debugging job requests stored in the debug queue 202a, the next level job requests handled are the high priority job requests stored in the high priority queue 202b, and so on in alphabetical order. As such, the number of priority levels and, thus, the number of queues (e.g., 5) in the job queues 202 can vary depending on the specific design requirements imposed for the two or more programming languages in use. The scheduling unit 200 sends the jobs residing in the job queues 202a–e to the appropriate (as addressed) executing processor 107, 114, 120, 121 in priority order (a to e). The scheduling unit sends a new job to the executing processor as soon as the previous job sent to that executing processor has been completed.

The scheduling unit 200 also includes a plurality of "wait-for" queues 204a–e and "periodic/timed" job queues 206a–e. Similar to the job queues 202a–e, the "wait-for" and "period/timed" job queues are prioritized to handle jobs in alphabetical order (a–e). An "active message reception language" message queue 208 is included for languages capable of active message reception (e.g., for Erlang).

The scheduling unit 200 also includes a search mechanism (implemented by a conventional software and/or hardware scheme) for combining the messages stored in the "active message reception language" message queue 208 with the "wait-for" tasks stored in the "wait-for" queues 204a–e. As soon as there is an "active message reception language" message received in the message queue 208 (e.g., generated from a PLEX "send" statement and sent via input data line 215, or from an Erlang application via input data line 212) from an executing processor, which can be combined with a "wait-for" request in the "wait-for" queue 204 (e.g., generated from a "receive" statement in an Erlang application via input data line 214), the scheduling unit deletes the message in the message queue 208 and the request in the "wait-for" queue 204a–e. The scheduling unit then sends the corresponding job to the corresponding job queue 206–e.

Any executing processor (e.g., 107, 114, 120, 121) running any programming language can send a periodic call request or timed job request to a periodic/timed job queue 206a–e via an input data line 218. Also, an incoming message for non-active message reception languages (e.g., PLEX) can be sent to the job queues 202a–e via input data lines 210 and 213. The instruction processor (not shown) can send outgoing messages to an external processor via the representative output data line 216, or receive incoming messages via the data lines 210, 212. The external processors (not shown) can send messages to the CP 100(X), as shown, for example, in FIG. 2B.

Returning to FIGS. 2A and 2B, the exemplary CPs 100A and 100B also include different levels of storage that form a memory hierarchy (e.g., those levels of storage nearest the processors are typically the fastest and smallest, the next levels are slower and larger, and so on). Some storage levels may be used as a cache for the next level. For example, CPs 100A and 100B include a level 2 cache memory 109, which (in these embodiments) is common to the executing processors 107, 114, 120, 121, etc. In the context of an Ericsson AXE Digital Switching System, a PLEX SPU including such a cache memory is referred to as an Instruction Processor Unit (IPU). According to a predetermined cache policy, the cache memory 109 is used by each executing processor for relatively fast access to data (copied from main memory) that is currently residing there, which minimizes the need to access main memory for that data.

The cache policy for the cache memory 109 is based on a number of factors. For example, although the processing capacities and clock frequencies of executing processors have increased significantly in recent years (and will probably continue to do so for the foreseeable near future), the access times for memories have not increased nearly so fast. Consequently, if that trend continues into the future, the primary processor design "bottlenecks" will be memory bandwidth, cache memory utilization, and cache latency (ability to lie hidden).

However, in accordance with the present invention, if a cache's "hit-rate" is high enough, several executing processors can be combined to utilize one common main store (e.g., such as program stores 110 and 116). However, a viable alternative is to utilize a separate main store for each executing processor. Another viable alternative is to utilize a common main store (e.g., a program store 110 or 116) in combination with separate second level caches (e.g., 109) and first level caches for each executing processor (e.g., as shown, a cache that is internal to each executing processor). As illustrated by FIGS. 2A and 2B, the preferred embodiments utilize a common main store (e.g., 110, 116) and common second level cache (e.g., 109) for all executing processors, in combination with a separate first level (internal) cache for each executing processor. The latter two alternatives are more flexible than the first and do not require an operator to allocate additional software in order to obtain maximum capacity. However, on the other hand, an operator may obtain maximum capacity using the first alternative with additional software allocations.

Also, as shown in the two embodiments illustrated by FIGS. 2A and 2B, the CPs 100A and 100B each include a common store 111. In these embodiments, the common stores 111 are utilized to store message data for all programming languages and/or executing processors being utilized (e.g., Erlang, PLEX, JAVA, etc.). Typically, the common stores 111 are used for storing relatively large messages.

In the embodiment of FIG. 2A, the CP 100A includes a heap memory 117 which can be utilized for all of the programming languages involved (e.g., Erlang and JAVA). A separate stack (push-down list, LIFO storage) 118, 119 is utilized for each programming language and/or executing processor involved (e.g., 118 for Erlang, 119 for JAVA, etc.). Typically, there is one stack for each process, or in other words, many stacks for each programming language and/or processor involved. Also, if the programming language supports threads, there is typically one stack for each thread. A common hardware support store 115 (FIG. 2A) is utilized for garbage collection (e.g., administration and recycling of common heap memory 117) for all programming languages and/or executing processors involved.

Alternatively, as illustrated by the embodiment shown in FIG. 2B, the CP 100B can include a data store 112 for one programming language and/or executing processor involved (e.g., for Erlang). Preferably, the data store 112 includes a stack and heap memory structure for the Erlang or similar programming language. The CP 100B can also include a combined data store and reference (address) store 113 for PLEX and similar programming languages. Notably, although the two embodiments in FIGS. 2A and 2B show specific memory and data store structures, they are provided for illustrative purposes only. As such, if numerous different programming languages and executing processors are utilized in any embodiment of the present invention, common or separate cache memory, main memory, stacks, heaps, etc. can be utilized for the programming languages and executing processors involved.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A central processor for a telephony system, comprising:
   a scheduling unit;
   at least two executing processors coupled to said scheduling unit, a first executing processor of said at least two executing processors for executing a first application with a first programming language, and a second executing processor of said at least two executing processors for executing a second application with a second programming language; and
   at least one job queue located within said scheduling unit for storing the at least one application to be executed and configured to identify which of the at least two executing processors should execute the at least one application.

2. The central processor of claim 1, wherein said first programming language comprises PLEX and said second programming language comprises JAVA or Erlang.

3. The central processor of claim 1, comprising a side of a central processor in a multi-central processor digital switching system.

4. The central processor of claim 1, further comprising a program store coupled to said at least two executing processors.

5. The central processor of claim 4, further comprising a data store coupled to said at least two executing processors.

6. The central processor of claim 1, further comprising a cache memory coupled to said at least two executing processors.

7. The central processor of claim 4, further comprising a separate cache memory coupled to each of said at least two executing processors.

8. The central processor of claim 1, further comprising a separate program store coupled to each of said at least two executing processors.

9. The central processor of claim 1, wherein said at least two executing processors further comprise a plurality of executing processors, said plurality of executing processors for executing a combination of JAVA, Erlang, PLEX and C programming languages.

10. The central processor of claim 1, wherein the at least one job queue determines a code stored within the applications, said code identify a particular one of the at least two processors for executing the at least one application.

11. The central processor of claim 1, wherein the at least one job queue includes a plurality of partitioned areas for storage of the applications, each of the plurality of partitioned areas for storing applications associated with a particular one of the at least two executing processors.

12. The central processor of claim 1, wherein the at least one job queue comprises:
 a plurality of job queues located within said scheduling unit for storing at least one application to be executed by the at least two executing processors, each of the plurality of job queues associated with a particular one of the at least two executing processors and storing applications only for that processor.

13. A central processor for a telephone system, comprising:
 a scheduling unit;
 at least two executing processors coupled to said scheduling unit, a first executing processor of said at least two executing processors for executing a first application with a first programming language, and a second executing processor of said at least two executing processors for executing a second application with a second programming language; and
 a plurality of job queues located within said scheduling unit for storing at least one application to be executed by the at least two executing processors, each of the plurality of job queues associated with a particular one of the at least two executing processors and storing applications only for that processor.

* * * * *